United States Patent [19]

Abuyama

[11] Patent Number: 4,888,650
[45] Date of Patent: Dec. 19, 1989

[54] IMAGE FORMING APPARATUS WITH FUNCTION OF AUTO ERROR CORRECTION FOR OPTICAL SYSTEM

[75] Inventor: Yasuo Abuyama, Ebina, Japan

[73] Assignee: Kabushiki Kaisha Toshiba, Kawasaki, Japan

[21] Appl. No.: 207,618

[22] Filed: Jun. 16, 1988

[30] Foreign Application Priority Data

Jun. 18, 1987 [JP] Japan ................................ 62-150284

[51] Int. Cl.$^4$ .............................................. H04M 1/04
[52] U.S. Cl. .................................... 358/451; 358/443; 358/464; 358/494
[58] Field of Search ............... 358/285, 287, 293, 294, 358/256, 280, 282

[56] References Cited

U.S. PATENT DOCUMENTS

4,660,094  4/1987  Yoshimoto et al. ................ 358/285

Primary Examiner—Edward L. Coles, Sr.
Attorney, Agent, or Firm—Cushman, Darby & Cushman

[57] ABSTRACT

An image forming apparatus according to this invention, for example, a digital copying machine, comprises an original scanning section, which includes an exposure lamp for exposing the image of an original, a lens unit which can change an image forming magnification when forming the image of the original exposed by the lamp and mirror unit, a photoelectric converter on which an image corresponding to the original image is formed by the original scanning section and which converts the formed image into an electric signal, a main controller for subjecting the electric signal to a predetermined signal processing to electrically change its magnification, and an image forming section for receiving and subjecting the processed signal to another predetermined signal processing to form an image on a sheet which corresponds to the original image. A focal length error of the lens unit caused in the production line is measured in advance, and, based on this measuring result, an error of the original scanning section is stored as compensation data in a non-volatile memory. At the time of changing the magnification of said electric signal by means of the original scanning section and the signal processing, the main controller reads out the compensation data from the memory and compensates for the error of the original scanning section based on this compensation data.

7 Claims, 11 Drawing Sheets

IMAGE FORMING APPARATUS WITH FUNCTION OF AUTO ERROR CORRECTION FOR OPTICAL SYSTEM

BACKGROUND OF THE INVENTION

1. Field of the Invention

This invention relates to an image forming apparatus, and, more particularly, to an improvement of an image forming apparatus which converts an image of an original into an electric signal through photoelectric conversion, performs a predetermined process on the electric signal and then forms an image corresponding to the original's image on a sheet in accordance with the processed signal.

2. Description of the Related Art

In making a copy by a conventional image forming apparatus, e.g., a copying machine, first, an original image disposed on an original table is exposed to light and scanned by a light source, such as an exposure lamp. The original image is formed, by light from the light source, on a photoconductive drum through a plurality of mirrors and lenses, and is then developed with a developer by a developing unit. This developed image is transferred on to a sheet fed from the outside of the main body of the copying machine and is fixed, which completes the copying process. The sheet with a copied image is then discharged outside of the main body.

With such a conventional copying machine, it is well known that lenses are moved to change the length of the light path by a predetermined amount in order to vary image magnification. In this case, due to variation in lenses through manufacturing processes, the focal lengths of individual lenses slightly differ from one another. To attain an accurate magnification, therefore, the displacement of the lenses should be changed in proportion to the focal lengths of the lenses. Conventionally, the focal length of each lens is measured in advance and the lens' displacement is determined on the basis of the measured data. Due to the mentioned slight variation in lenses, however, this method requires many processes for the measurement.

In a so-called digital copying machine which converts an image of an original into an electric signal through photoelectric conversion, performs a predetermined process on the electric signal and then forms an image corresponding to the original's image on a sheet in accordance with the processed signal, the magnification change by an optical system and the magnification change by an electric signal processing are used together. In the digital copying machine, therefore, it is necessary to accurately compensate for variation in the focal lengths of lenses. Accordingly, with the use of the aforementioned method, it takes a great deal of time for measuring the lenses' focal lengths and adjustment of the machine based on the measured data, thus making the machine assembling difficult. In addition, the conventional method deteriorates the magnification accuracy.

SUMMARY OF THE INVENTION

Accordingly, it is an object of this invention to provide an image forming apparatus which can perform auto compensation of variation in optical systems, is easy to assemble and has an improved magnification accuracy.

According to one aspect of this invention, there is provided a scanning apparatus which comprises means for supporting an original having an image, means for applying light to the original supported by the supporting means, means for converting the light from the original to an electric signal corresponding to the original image with a predetermined magnification, means for directing the light from the original to the converting means, the directing means having a fixed focal length and being movably disposed at a first position between the supporting means and the converting means by the fixed focal length, means for discriminating a variation in the fixed focal length of the directing means by comparing the signal converted by the converting means with a signal having a predetermined reference value related to the magnification, and means for moving the directing means from the first position to a second position in accordance with the variation discriminated by the discriminating means.

BRIEF DESCRIPTION OF THE DRAWINGS

The manner in which the foregoing and other objects of the present invention will be apparent from the following description and claims considered together with the accompanying drawings in which:

DETAILED DESCRIPTION OF THE PREFERRED EMBODIMENTS

An embodiment of this invention will be explained below referring to the accompanying drawings.

Figure 1:
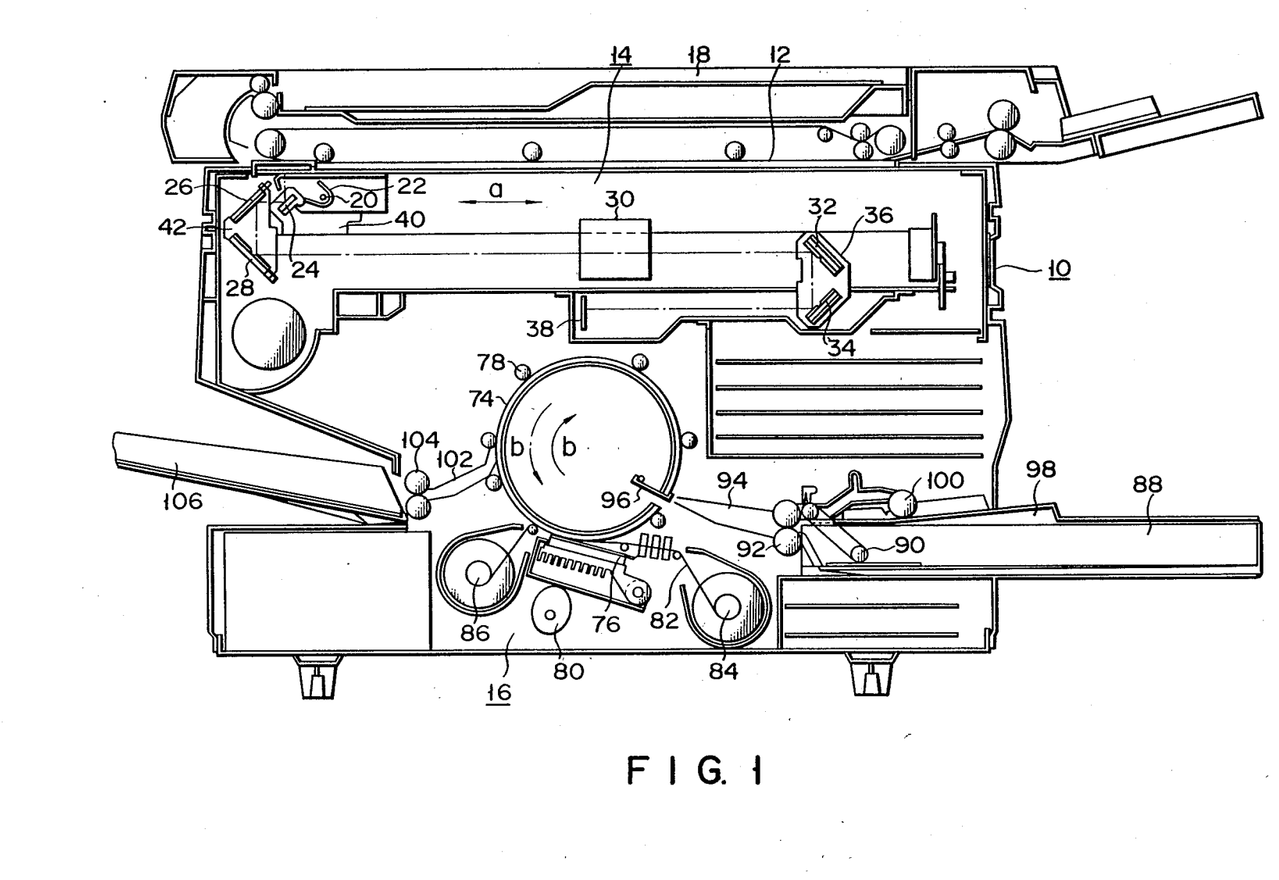
FIG. 1 is a front lateral cross-sectional view illustrating the arrangement of a digital copying machine.

FIG. 1 illustrates a digital copying machine of a thermal transfer type to which an image forming apparatus according to this invention is applied. Numeral 10 denotes the main body of the copying machine, and an operation panel (not shown) is provided at the upper front portion of this main body. The upper portion of main body 10 constitutes original scanning section (optical system) 14 for scanning an original set on original table 12, and the lower portion of main body 10 constitutes image forming section 16. On original table 12 is provided an original auto feeder 18 which may be opened. Original table 12 is made of, for example, transparent glass and is secured to main body 10.

Original scanning section 12 comprises, for example, exposure lamp (e.g., halogen lamp) 20 serving as a light source to irradiate an original set on original table 12; reflector 22 for converging light from exposure lamp 20 onto the surface of the original; first mirror 24 for directing the light reflected from the original in a predetermined direction; and second and third mirrors 26 and 28 for directing the light reflected from the first mirror 24 in a predetermined direction. Original scanning section 12 further comprises magnification-changing lens unit 30 for passing the light from second and third mirrors 26 and 28; mirror unit 36 for reflecting the light emitted from lens unit 30 and compensating for the length of the light path at the time the coping magnification is changed (which will be described later in detail); and photoelectric converter 38 which receives the light from mirror unit 36. Mirror unit 36 includes fourth and fifth mirrors 32 and 34.

Exposure lamp 20 is secured together with reflector 22 and first mirror 24 to first carriage 40. Second and third mirrors 26 and 28 are secured to second carriage 42. First and second carriages 40 and 42 are linearly and reciprocatively movable in the directions of arrow a in FIG. 1 in parallel to original table 12. This movement is supported by a slide guide (not shown).

The position of mirror unit 36 is changed in accordance with a change in the length of the light path which is caused by a selected copying magnification. Mirror unit 36 reflects the light from lens unit 30 by means of fourth and fifth mirrors 32 and 34, and guides the light to photoelectric converter 38.

Photoelectric converter 38 photoelectrically converts the light reflected from the original into an electrical signal representing the image of the original, is constituted mainly by a CCD type line sensor, and is disposed in a direction orthogonal to the original scanning directions (those indicated by the arrow a).

Figure 2:
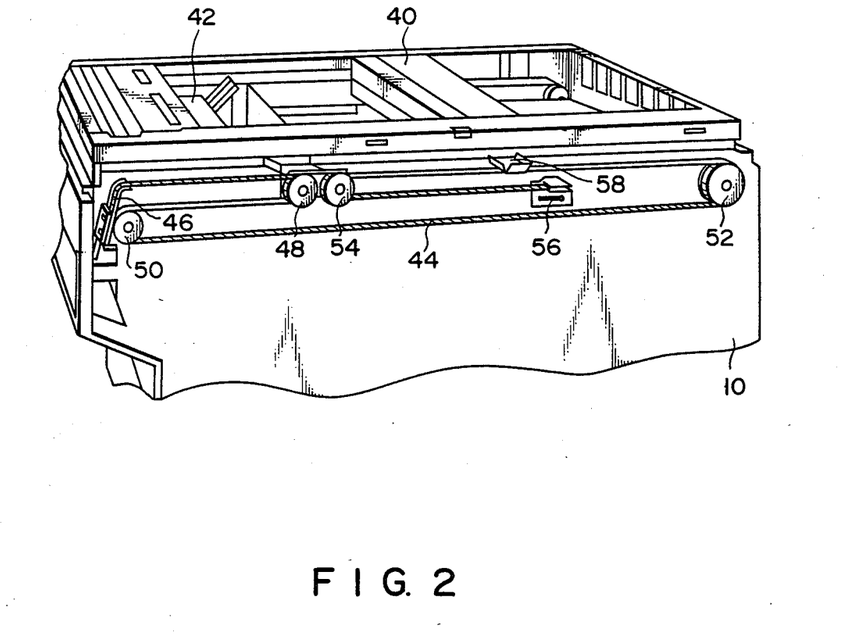
FIG. 2 is a perspective view for explaining a carriage moving mechanism.

FIG. 2 illustrates a carriage moving mechanism in which timing belt 44 has its one end secured to main body 10 by securing member 46 and has the other end secured to main body 10 by securing member 56. Timing belt 44 extends over pulleys 48 and 50 attached to one end of second carriage 42, drive pulley 52 and pulley 54 attached to that end of second carriage 42. First carriage 40 is secured to timing belt 44 by a drive member 58 attached to one end of the carriage 40. Although not illustrated in FIG. 2, the opposite side of the carriage moving mechanism has the same construction. With this arrangement, rotating drive pulley 52 by a carriage motor to be described later causes timing belt 44 to reciprocate first carriage 40 and second carriage 42 in parallel to original table 12. At this time, second carriage 42 moves in the same direction (as indicated by the arrow a) at half the speed of first carriage 40 so as to retain constant the light path length between the original surface and photoelectric converter 38.

Figure 3:
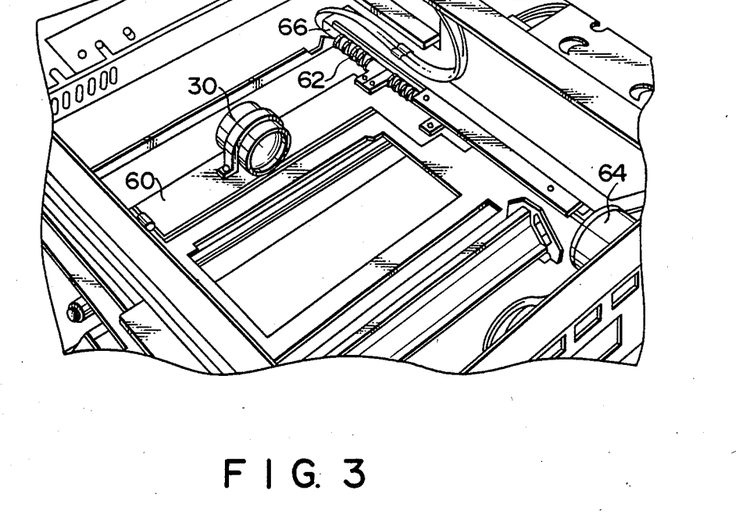
FIG. 3 is a perspective view for explaining a lens-unit moving mechanism.

FIG. 3 illustrates a lens-unit moving mechanism. Lens unit 30 is secured on support table 60, which has its one end slidable on a face parallel to the light axis of lens unit 30 and has the other end held by a member (not shown) that engages screw shaft 62 parallel to the light shaft of lens unit 30. Screw shaft 62 is rotatably driven by lens motor 64. Numeral 66 denotes a lens switch for detecting the position of lens unit 30.

Figure 4:
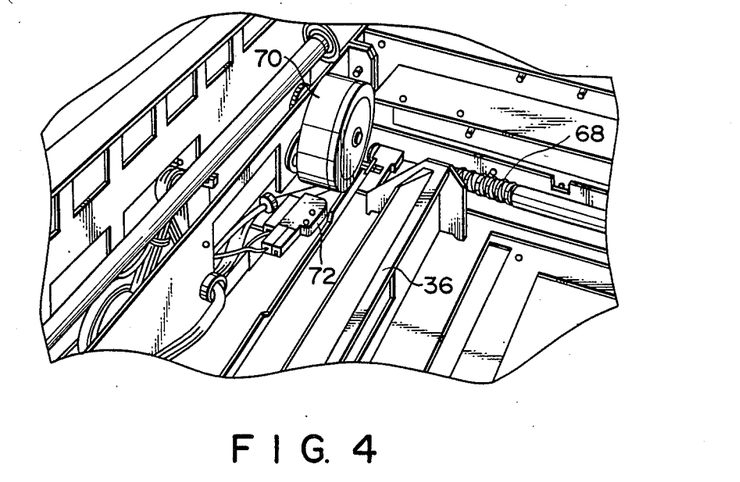
FIG. 4 is a perspective view for explaining a mirror-unit moving mechanism.

FIG. 4 illustrates a mirror-unit moving mechanism. Mirror unit 36 has its one end slidable on a face parallel to the light axis of lens unit 30 and has the other end held by a member (not shown) that engages a screw shaft 68 parallel to the light shaft of lens unit 30. Screw shaft 68 is rotatably driven by a mirror motor 70. Numeral 72 denotes a mirror switch for detecting the position of mirror unit 36.

The carriage motor, lens motor 64 and mirror motor 70 are stepping motors. Data of the positions of first carriage 40, lens unit 30 and mirror unit 36 are stored in data registers CRPOS, LNPOS and MRPOS located in a main controller (which will be described later) so that the data in the registers are updated every time the individual motors are driven.

Image forming section 16 is constituted as follows. A cylindrical sheet holding drum 74 is disposed at nearly the center portion of image forming section 16. This drum 74 has its outer surface coated with a resilient member such as rubber and serves as a platen roller of thermal head 76 to be described later. Drum 74, when rotated in the clockwise direction (the direction of the arrow b in FIG. 1), wraps a sheet around its outer surface and holds it there. Pushing rollers 78 are provided around drum 74 at predetermined intervals to prevent the sheet from lifting from the outer surface of drum 74. The circumference of drum 74 is set slightly larger than the lengthwise length of a sheet of the maximum size allowable in the copying machine.

Thermal head 76 is provided at the bottom section of drum 74 and is designed to be pressed against the surface of drum 74 by pressing cam 80. Ink ribbon 82 as an image-forming medium is interposed between drum 74 and thermal head 76. This ink ribbon 82 has its both ends respectively wound around winding cores 84 and 86, which are coupled to the drive shaft of a motor through a driving momentum transmission mechanism (not illustrated) so that they are rotatably driven as desired.

At the bottom portion of main body 10 and at the right side section in FIG. 1 is feeding cassette 88 detachably provided which contains sheets as image-receiving media. The sheets in feeding cassette 88 are fed out one by one by automatic feed roller 90 and a pair of separation rollers 92 and are conveyed toward drum 74 by guide 94. Gripper 96 is provided at the portion of drum 74 which faces the free end of guide 94 and grips the fore end of the sheet guided by guide 94 so that the sheet is wrapped around drum 74 and held there. Numeral 98 denotes manual feeding table for manually feeding sheets or the like, and a sheet fed from this feeding table 98 is conveyed toward separation roller pair 92 by manual feed roller 100.

The sheet having its fore end gripped by gripper 96 is wrapped around drum 74 by the clockwise rotation (the direction indicated by the arrow b) thereof and held there. After the sheet's fore end passes an image forming area, thermal head 76 is pressed against drum 74 to form an image. By the time the image forming is done, drum 74 nearly makes one rotation. At this stage, the pressure by thermal head 76 on drum 74 is released and the sheet is discharged. More specifically, drum 74 is rotated in the clockwise direction (the direction indicated by the arrow b) until the rear end of the sheet reaches a sheet-discharging guide 102 and drum 74 is then rotated in the counterclockwise direction (the one indicated by the arrow b'). This causes a separator (not shown) to separate the rear end of the sheet from the surface of drum 74 to guide the sheet to guide 102, and the sheet is then discharged to a receiving tray 106 by a pair of exit rollers 104. At this time, gripper 96 releases its grip on the sheet at the proper timing.

Figure 5:
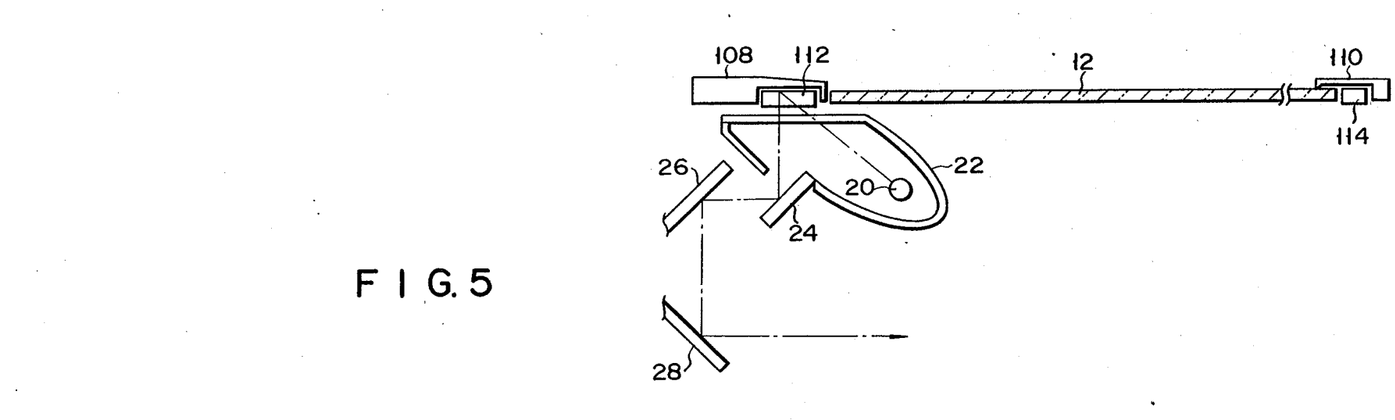
FIG. 5 is a diagram for explaining the state in which a reference original is set.
Figure 6:
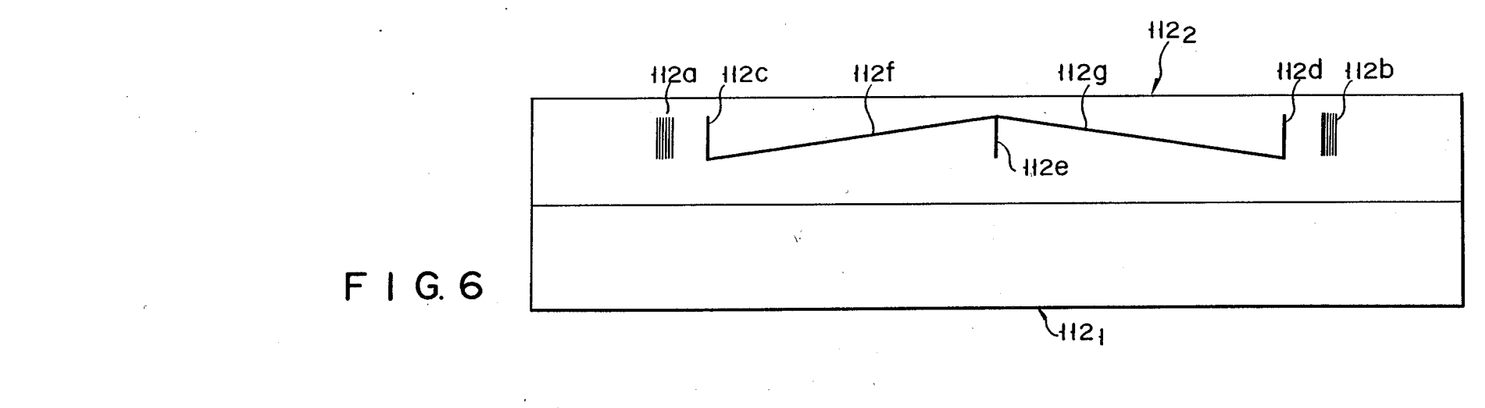
FIG. 6 is a plan view for explaining the reference original.

At both ends of original table 12 in the carriage moving direction are provided original-table holding members 108 and 110, respectively, as shown in FIG. 5. These members 108 and 110 are attached with first and second reference originals 112 and 114, respectively. First reference original 112 is constituted by forming a white reference area 1121 and a lens compensation area area 1122 on a transparent glass board, as shown in FIG. 6. White reference area 1121 is formed by coating white paint on the transparent glass board, and lens compensation area 1122 is formed by printing black on the transparent glass board the illustrated pattern, i.e., focus adjusting marks (thin lines) 112a and 112b, magnification adjusting marks 112c, 112d and 112e, and position detecting marks 112f and 112g. Second reference original 114 has the same structure as, for example, lens compensation area 1122 of first reference original 112.

Figure 7:
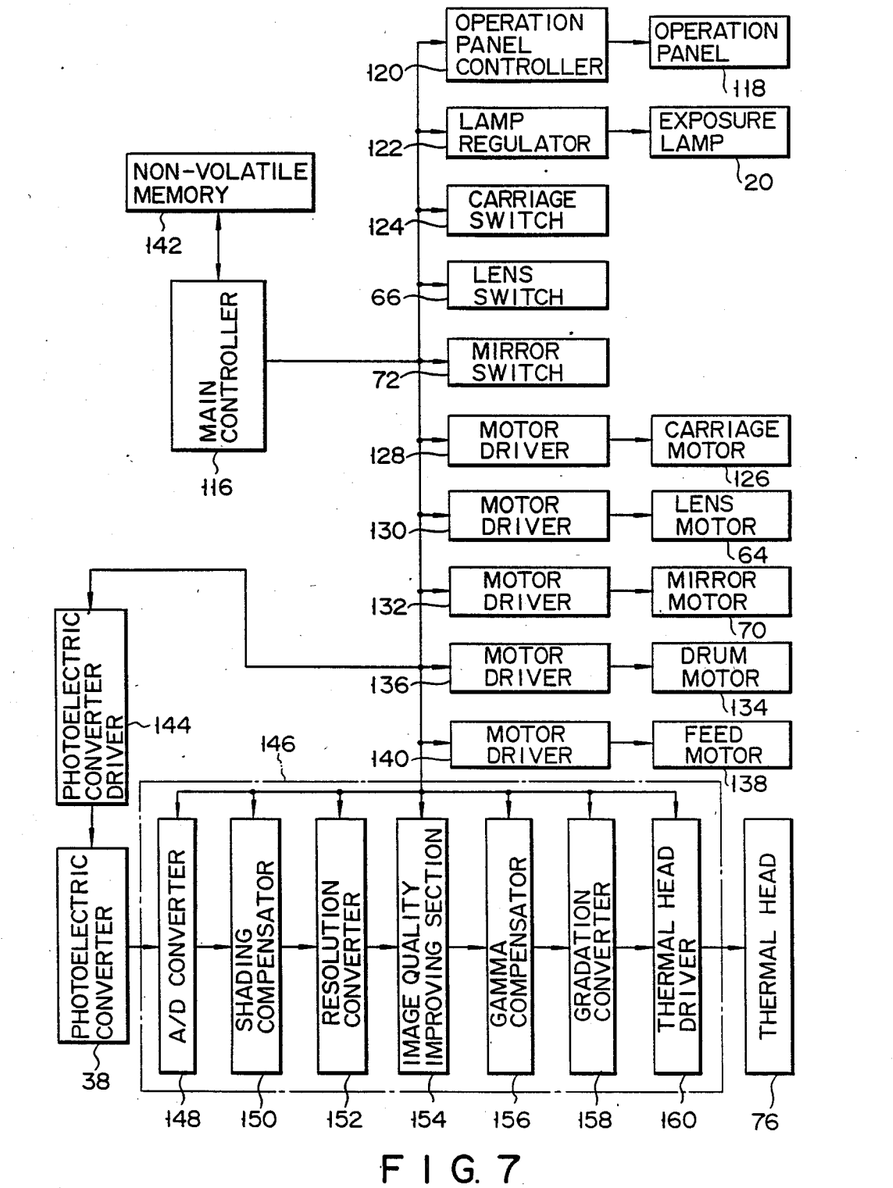
FIG. 7 is a block diagram illustrating the arrangement of a control circuit.

FIG. 7 illustrates the arrangement of a control circuit of the copying machine. Numeral 116 is a main controller mainly comprising a CPU for executing the general control of the copying machine. Main controller 116 is coupled to operation panel controller 120 for controlling operation panel 118, lamp regulator 122 for controlling exposure lamp 20, carriage switch 124 for detecting the position of the carriage, lens switch 66, mirror switch 72, motor driver 128 for driving carriage motor 126, motor driver 130 for driving lens motor 64, motor driver 132 for driving mirror motor 70, motor driver 136 for driving drum motor 134 that drives drum 74, etc., and motor driver 140 for driving feed motor 138 that drives feed rollers 90 and 100, or the like. Main controller 116 is further coupled to non-volatile memory 142 for storing data, photoelectric converter driver 144 for driving photoelectric converter 38 and image processing section 146. This image processing section 146 processes the output signal of photoelectric converter 38 to control thermal head 76, and comprises AD converter 148, shading compensator 150, resolution converter 152, image quality improving section 154, gamma compensator 156, gradation converter 158 and thermal head driver 160.

Figure 8A:
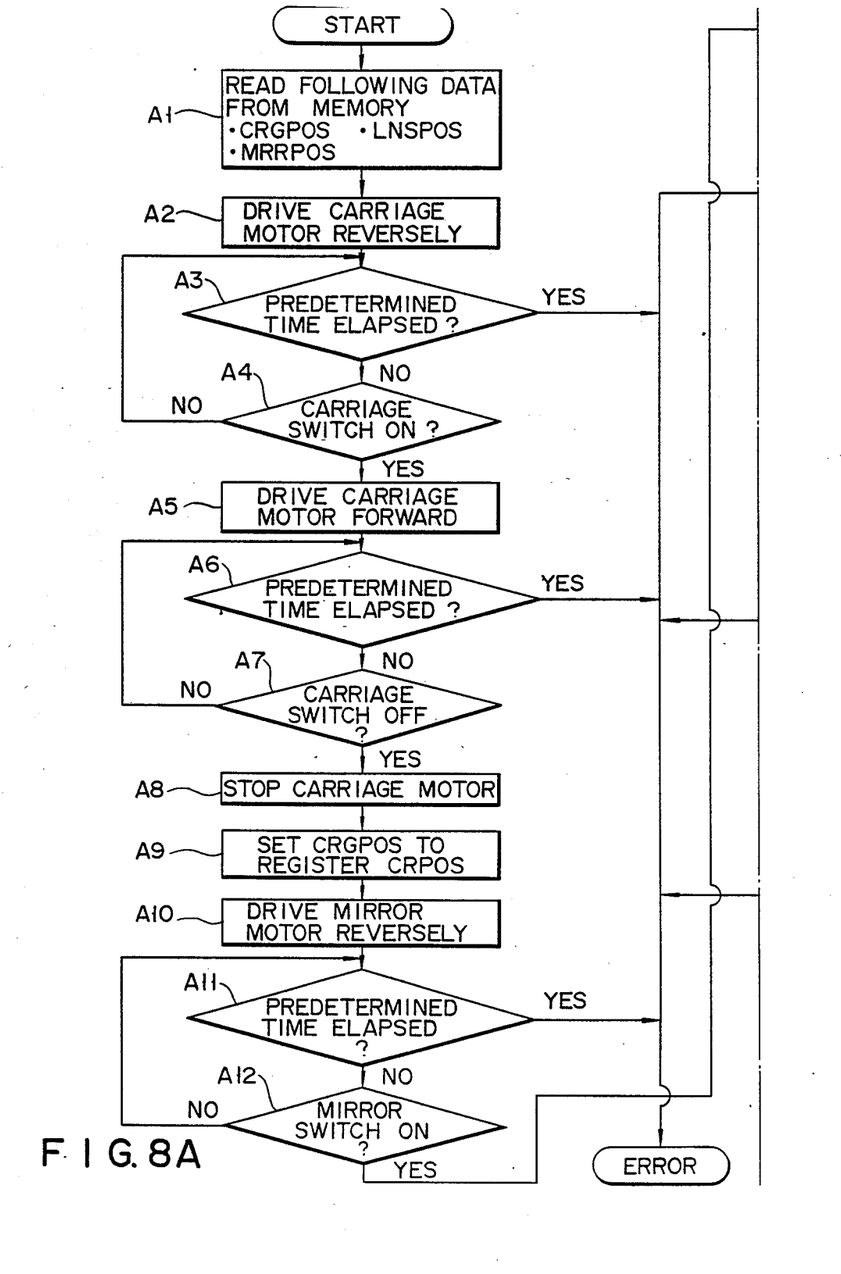
FIGS. 8A and 8B are a flowchart for explaining the initializing the individual positions of a first carriage, a mirror unit and a lens unit.
Figure 8B:
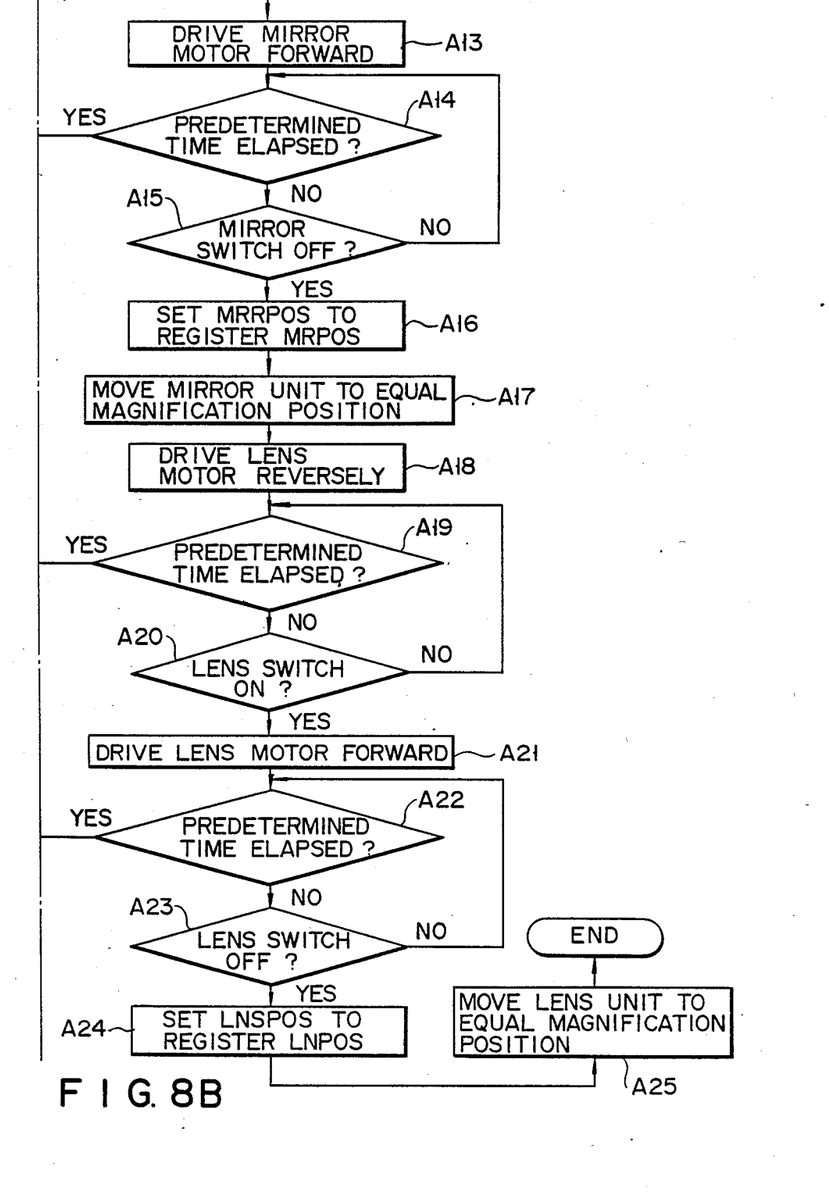

The initializing operation for the positions of first carriage 40, mirror unit 36 and lens unit 30 will now be explained referring to the flowchart shown in FIGS. 8A and 8B.

As mentioned earlier, the individual positions of first carriage 40, mirror unit 36 and lens unit 30 are stored as data in data registers CRPOS, MRPOS and LNPOS in main controller 116. Immediately upon powering the copying machine, the initializing operation is performed to set the initial values of these data registers CRPOS, MRPOS and LNPOS. First, main controller 116 reads out assembling variation compensation data CRGPOS, MRRPOS and LNSPOS which are stored in advance in non-volatile memory 142 (step A1), and then initializes the position of first carriage 40. The following is the routine for the initialization. Carriage motor 126 is reversely rotated (step A2) and it is discriminated whether or not a predetermined time has elapsed (step A3). If the predetermined time is discriminated to have elapsed, the operation is considered to be in error, and if it is within the predetermined time, the positioning switch (carriage switch 124) of first carriage 40 is turned ON (step A4). If the carriage switch 124 is not turned ON, the flow returns to step A3. When carriage switch 124 is turned ON, carriage motor 126 is rotated forward (step A5), and it is discriminated whether or not a predetermined time has elapsed (step A6). As per step A3, if the predetermined time is discriminated to have elapsed, the operation is considered to be in error, and if it is within the predetermined time, carriage switch 24 is turned OFF (step A7). If the carriage switch 124 is not turned OFF, the flow returns to step A6. When first carriage 40 is moved to a position where the mode of carriage switch 124 is changed from ON to OFF, carriage motor 126 is stopped (step A8). Under this state, the value of register CRPOS for the position of first carriage 40 is set to the assembling variation compensation data CRGPOS read out from non-volatile memory 142 (step A9). This completes the initialization of the position of first carriage 40.

Then, the positions of mirror unit 36 and lens unit 30 are initialized in the same manner as is done for the position initialization of first carriage 40.

Mirror motor 70 is rotated reversely (step A10), it is discriminated whether or not a predetermined time has elapsed (step A11), and in accordance with the discrimination result, either the operation is considered to be in error or the positioning switch (mirror switch 72) of mirror motor 70 is turned ON (step A12). If mirror switch 72 is not turned ON, the flow returns to step A11. If mirror switch 72 is turned ON, mirror motor 70 is rotated forward (step A13), it is discriminated whether or not a predetermined time has elapsed (step A14), and in accordance with the discrimination result, either the operation is considered to be in error or mirror switch 72 is turned OFF (step A15). If mirror switch 72 is not turned OFF, the flow returns to step A14. When mirror unit 36 is moved in this manner to a position where the mode of mirror switch 72 is changed from ON to OFF, the value of register MRPOS for the position of mirror unit 36 is set to the assembling variation compensation data MRRPOS read out from memory 142 (step A16). Immediately upon completion of the initialization of the position of mirror unit 36, this unit 36 is moved to an equal magnification position (step A17) and mirror motor 70 is stopped thereafter.

The initialization of the position of lens unit 30 is then executed. Lens motor 64 is rotated reversely (step A18), it is discriminated whether or not a predetermined time has elapsed (step A19), and in accordance with the discrimination result, either the operation is considered to be in error or the positioning switch (lens switch 66) of lens motor 64 is turned ON (step A20). If lens switch 66 is not turned ON, the flow returns to step A19. If lens switch 66 is turned ON, lens motor 64 is rotated forward (step A21), it is discriminated whether or not a predetermined time has elapsed (step A22), and in accordance with the discrimination result, either the operation is considered to be in error or lens switch 66 is turned OFF (step A23). If lens switch 66 is not turned OFF, the flow returns to step A22. When lens unit 30 is moved in this manner to a position where the mode of lens switch 66 is changed from ON to OFF, the value of register LNPOS for the position of lens unit 30 is set to the assembling variation compensation data LNSPOS read out from memory 142 (step A24). Immediately upon completion of the initialization of the position of lens unit 30, this unit 30 is moved to an equal magnification position (step A25) and lens motor 64 is stopped thereafter to be ready for the start of a copying operation.

The operation in the case where a copying magnification is changed will be explained below. According to this embodiment, over the range from 35% to 560%, for example, the magnification can be set by the scale of 1%. In this case, thermal head 76 forms an image at a constant speed irrespective of the copying magnification. With regard to the direction (the one indicated by the arrow a in FIG. 1) orthogonal to the lengthwise direction of photoelectric converter 38, the magnification is changed by setting the moving speed (scanning speed) of first carriage 40 to a speed proportional to the reciprocal of the copying magnification. In contrast, with regard to the lengthwise direction of photoelectric converter 38, the magnification is changed as follows by combining an optical method and an electric signal processing method.

Figure 9:
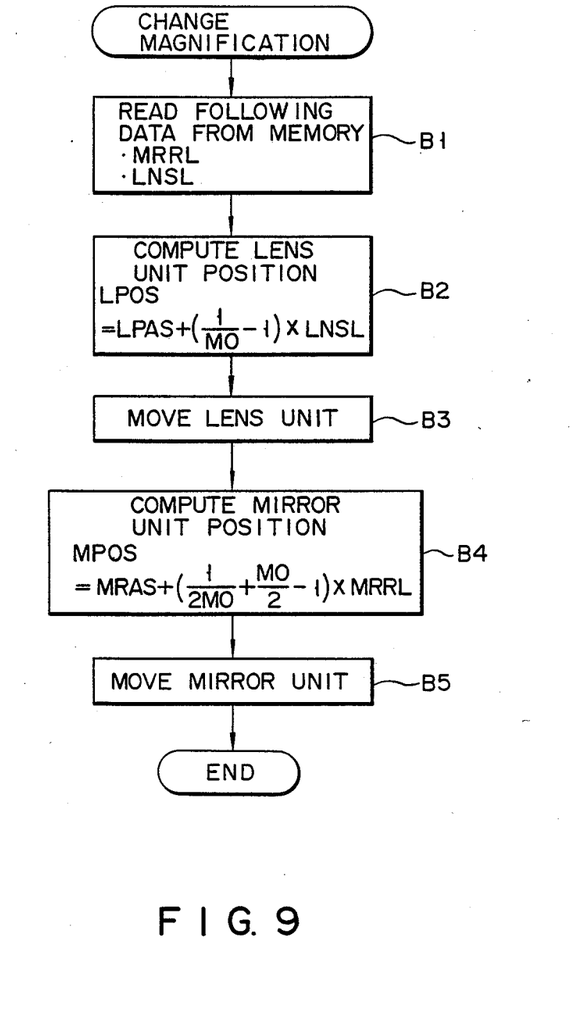
FIG. 9 is a flowchart for explaining an optical magnification change.

To begin with, the optical magnification changing method will be explained below referring to the flowchart shown in FIG. 9. The optical magnification change is performed by moving lens unit 30 and mirror unit 36. Main controller 116 reads out data LNSL and MRRL which are stored in advance in non-volatile memory 142 and correspond to the focal distance of lens unit 30 (step B1). Both of the data LNSL and MRRL are constants lens unit 30 has. Based on the following equation (1), the position LPOS of lens unit 30 is computed (step B2).

$$LPOS = LPAS + \left(\frac{1}{M0} - 1\right) \times LNSL \quad (1)$$

where M0 is an optical magnification, LPAS is the position of lens unit 30 at an equal magnification. After computing the position LPOS of lens unit 30, main controller 116 moves lens unit 30 to the computed position (step B3). That is, lens unit 30 is set to the position shifted from the equal magnification position by "((1/M0)−1)×LNSL".

Main controller 116 then computes the position MPOS of mirror unit 36 based on the following equation (2) (step B4).

$$MPOS = MRAS + \left(\frac{1}{2M0} + \frac{M0}{2} - 1\right) \times MRRL \quad (2)$$

where MRAS is the position of mirror unit 36 at the equal magnification. After computing the position MPOS of mirror unit 36, main controller 116 moves mirror unit 36 to the computed position (step B5). In other words, mirror unit 36 is set to the position shifted from the equal magnification position by "((1/2M0)+(M0/2)−1) ×MRRL". In this manner, the magnification can be changed by the optical method.

Data LNSL and MRRL are stored in the memory as different values because the 1-step displacements of the stepping motors for lens unit 30 and mirror unit 36 differ from each other due to the difference in their driving mechanisms.

The magnification change by the signal processing will now be explained. Changing the magnification over a broad range by the optical magnification change necessitates that the moving distances of lens unit 30 and mirror unit 36 should be large, thus inevitably increasing the size of the main body of the copying machine. In addition, as the amount of light incident to photoelectric converter 38 greatly varies, it is necessary to set the compensation range broader, thus significantly complicating the circuit structure. According to this embodiment, therefore, the magnification by the signal processing method with respect to the lengthwise direction of photoelectric converter 38 can be selectively set to one of four values, e.g., ½, 1, 2 or 4. This method, in combination of the aforementioned optical method, can ensure a magnification from 35% to 560%. According to the magnification change by the signal processing, for reduction (½), signals are thinned and for enlargement (2 or 4), the same signals are used a plural number of times. For instance, to realize a 60% magnification, the magnification by the optical method is set to 120% and the magnification by the signal processing is set to 50%. For a 300% magnification, the magnification by the optical method is set to 75% and the one by the signal processing is set to 400%.

With regard to how to set the aforementioned assembling variation compensation data CRGPOS, MRRPOS, LNSPOS, MRRL and LNSL, according to this embodiment, a program for setting the above data is installed in main controller 116 and executing this program stores the data in non-volatile memory 142.

Figure 10A:
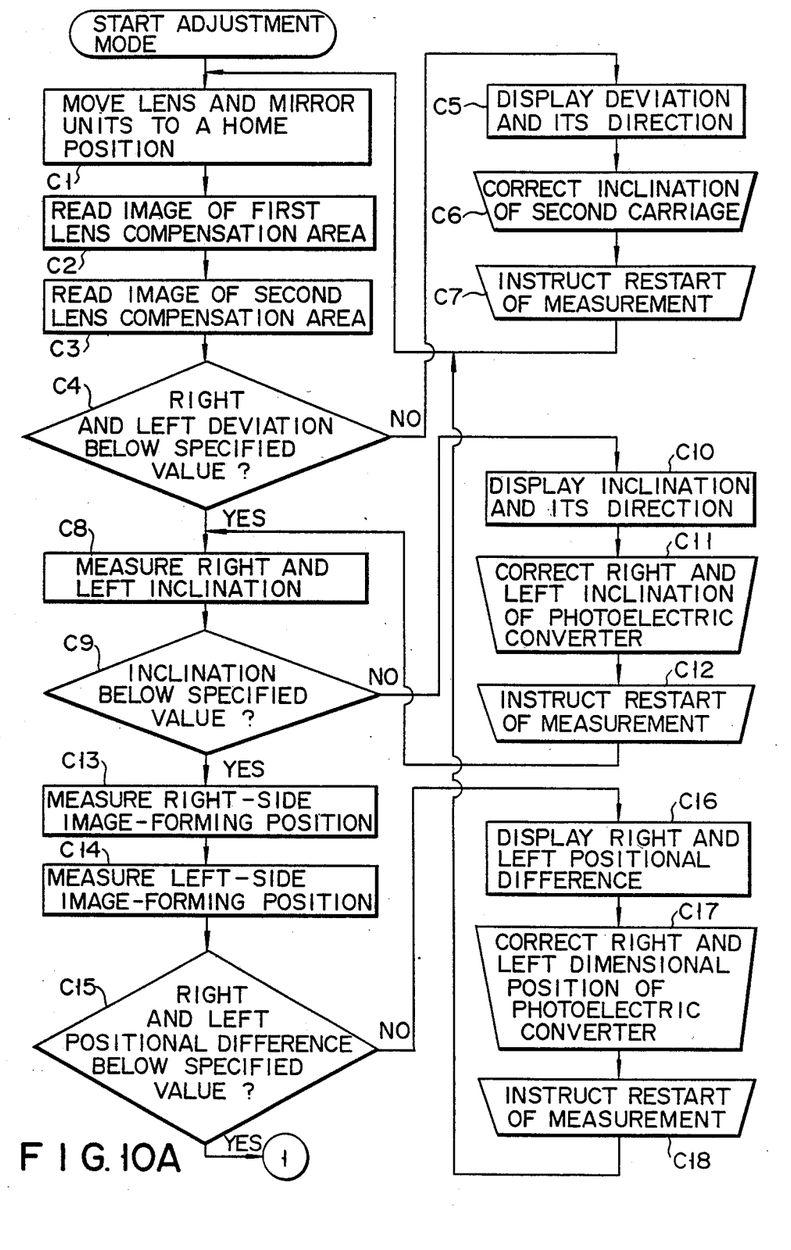
FIGS. 10A and 10B are a flowchart for explaining the machine operation in a variation compensation data setting mode.
Figure 10B:
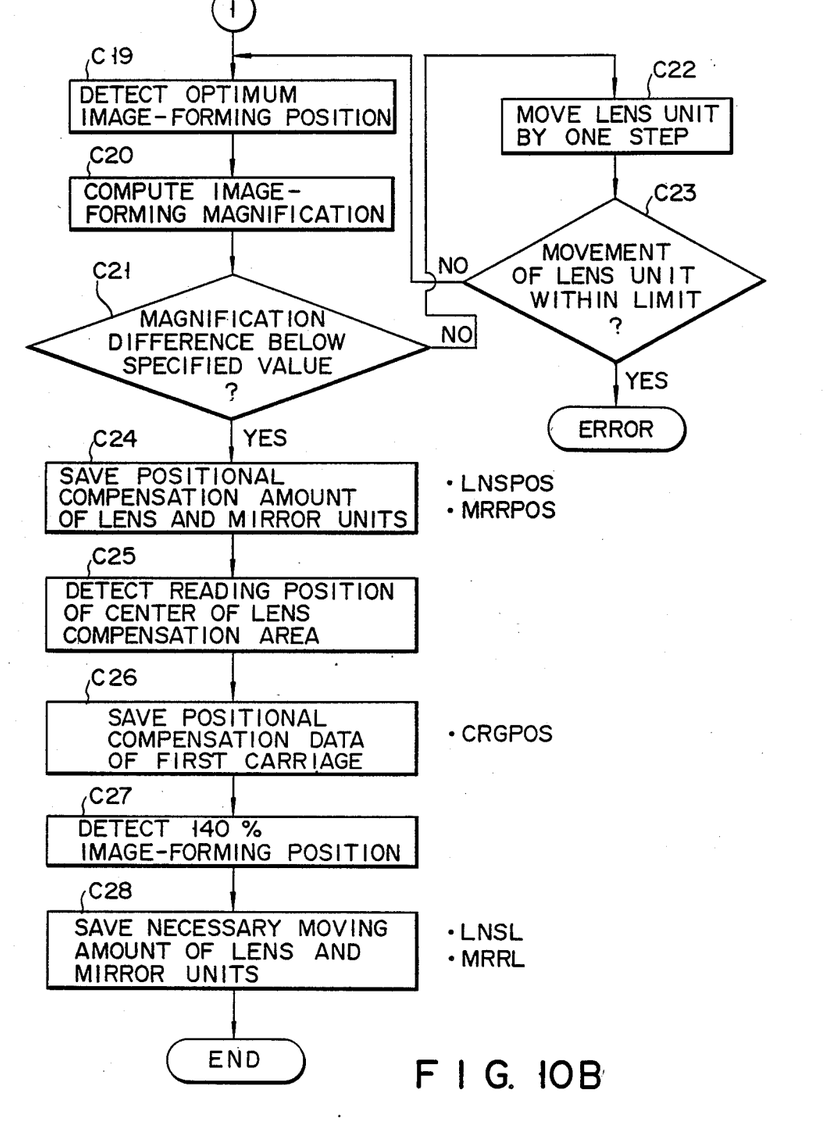

Referring now to the flowchart of FIGS. 10A and 10B, the operation in a data setting mode will be explained. This data setting mode is executed in the following sequence.

(1) Correction of the inclination of the second carriage.

(2) Correction of right and left inclination of the photoelectric converter.

(3) Correction of right and left dimension of the photoelectric converter.

(4) Detection of the optimum image-forming position.

(5) Detection of an error in a read-out position.

(6) Compensation of variation in lenses' focal lengths.

Processes (1) to (3) involve displaying the amount of correction on a status display section of operation panel 118 to help manual adjustment. Processes (4) to (6) ensure automatic detection of the amount of compensation and save the amount in nonvolatile memory 142 in order to execute the compensation.

First, the correction of the inclination of the second carriage (process (1)) is performed; this process corrects the parallel balance of second carriage 42 with respect to first carriage 40. Main controller 116 moves lens unit 30 and mirror unit 36 to a reference position (step C1). Main controller 116 also turns on exposure lamp 20, and moves first carriage 40 to the position where lens compensation area (first lens compensation area) 1122 of first reference original 112 is readable after the amount of the light from lamp 20 is stabilized. Then, the reflection light from lens compensation area 1122 is photoelectrically converted by photoelectric converter 38 so that image data of lens compensation area 1122 are read through A/D converter 148 (step C2). Then, main controller 116 moves first carriage 40 to the position at which second reference original 114 (second lens compensation area) can be read out. The reflection light from second reference original 114 is then photoelectrically converted and the image data of second reference original 114 is read out through A/D converter 148 (step C3).

Then, main controller 116 calculates the difference between the position of mark 112e on photoelectric converter 38, at the time first lens compensation area 1122 is read and the position of a mark (not shown) on photoelectric converter 38, at the time the second lens compensation area is read, and discriminates whether or not the difference is below a predetermined specified value (step C4). If the discrimination in step C4 indicates that the difference is below the specified value, the sequence advances to process (2) for correcting the right and left inclination of the photoelectric converter. If the difference is not below the specified value, main controller 116 displays on operation panel 118 how much and in what direction the inclination is (step C5). For instance, if the second lens compensation area is deviated from first lens compensation area toward the rear side of main body 10 by 5 mm, "AJ1+5" is displayed. Here, "AJ1" indicates that the inclination correction of the second carriage is abnormal, and "+5" indicates that the deviation is 5 mm toward the rear side of main body. If the deviation is toward the front side of main body 10, "−5" is displayed. After correcting the inclination of second carriage 42 in accordance with this instruction (step C6), an operator depresses a copy start key to instruct the restart of the measurement (step C7). Consequently, the flow returns to step C1 and the same operation as has been explained above is performed thereafter. If the aforementioned difference falls below the specified value, the sequence advances to the next process (2) for correcting the right and left inclination of the photoelectric converter.

Figure 11A:
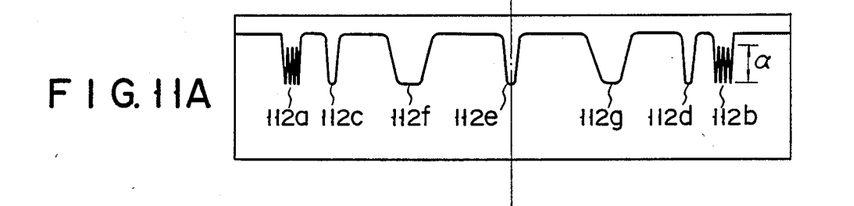
FIGS. 11A through 11E are waveform diagrams exemplifying output signals of a photoelectric converter.
Figure 11B:
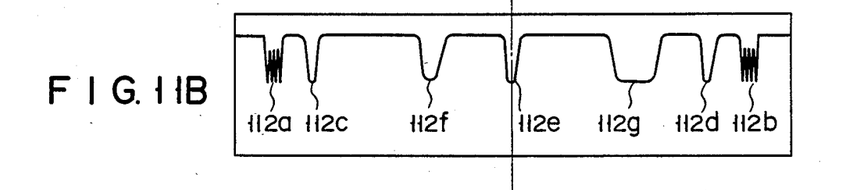

In process (2), assuming that the light receiving face of photoelectric converter 38 coincides with the image-forming face of the original's image, mark 112a, or the like, can be relatively well reproduced, as shown in FIG. 11A. In the same figure, the vertical scale represents the contrast while the horizontal scale corresponds to the lengthwise direction of the lens compensation area and represents the thickness of each mark when that mark is traversed (the same in FIGS. 11B through 11E). If the lengthwise directional axis of photoelectric converter 38 is inclined to the slit axis of the original scanning, when position detection marks 112f and 112g are read, the distances from magnification adjustment mark 112e to marks 112f and 112g become imbalanced. Main controller 116 detects this imbalance to thereby detect the inclination. Specifically, main controller 116 finds the position where mark 112f at the middle of the distance between marks 112e and 112a can be read, by moving first carriage 40. Main controller 116 measures the amount of deviation between the middle of the distance over marks 112e and 112d, and mark 112g (step C8), and discriminates whether or not the amount of deviation is below a predetermined specified value (step C9). If the discrimination indicates that the deviation falls below the specified value, the sequence advances to process (3) in which correction of the right and left dimension of the photoelectric converter is corrected. If the deviation does not fall below the specified value, the amount of deviation is displayed on operation panel 118 to call the operator's attention to the correction (step C10). As per process (1) for correcting the inclination of the second carriage, after correcting the right and left inclination of photoelectric converter 38 in accordance with this instruction (step C11), the operator depresses the copy start key to instruct the restart of the measurement (step C12). As a result, the flow returns to step C8 and the same operation as has been described above is performed. If the amount of the inclination falls below the specified value, the sequence advances to process (3) for correcting the right and left dimensions of the photoelectric converter.

Figure 11C:
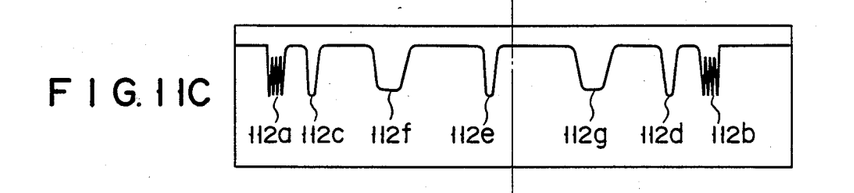
Figure 11D:
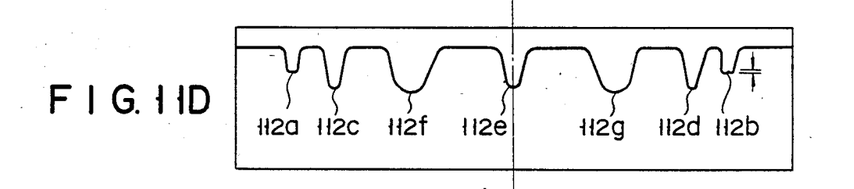
Figure 11E:
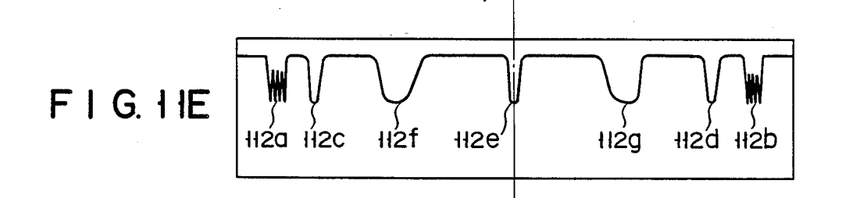

In process (3), it is checked how much the light-receiving face of photoelectric converter 38 is deviated from the image-forming face of the original's image in the lateral direction. For instance, marks 112a, 112e, or the like, are deviated from the center toward the left side as shown in FIG. 11C, the position of photoelectric converter 38 is deviated toward the front side of the sheet in FIG. 1. Therefore, first carriage 40 is moved first to read mark 112b on the right side of first lens compensation area $112_1$. If the light receiving face of photoelectric converter 38 is separated from the image-forming face of the original's image, mark 112b would not be reproduced in the way as shown in FIG. 11A but would be in an unfocused state as shown in FIG. 11D. According to third embodiment, the difference $\alpha$ between the brightest portion and the darkest portion at mark 112b is detected by moving mirror unit 36, and the position of mirror unit 36 which maximizes the difference $\alpha$ is found through measurement (step C13). Then, with regard to left mark 112a, the position of mirror unit 36 which maximizes the difference $\alpha$ is similarly found through measurement (step C14). And, main controller 116 computes the difference between the optimum image-positions of marks 112a and 112b and discriminates whether or not this difference is below a predetermined, specified value (step C15). If the discrimination indicates that the difference falls below the specified value, the sequence advances to process (4) in which the optimum image-forming position is detected. If the difference does not fall below the specified value, this difference is displayed on operation panel 118 to call the operator's attention to the correction (step C16). As per the aforementioned process (2) for correcting the right and left inclination of the photoelectric converter, after correcting the right and left dimension of photoelectric converter 38 in accordance with this instruction (step C17), the operator depresses the copy start key to instruct the restart of the measurement (step C18). As a result, the flow returns to step C1 and the same operation as has been described above is performed.

Process (4) for detecting the optimum image-forming position is then executed. To make the marks shown in FIG. 11D to those shown in FIG. 11A, the optimum image-forming positions of marks 112a and 112b are first detected by the method used in process (3) (step C19), and the middle point of these positions is set to the optimum image-forming position for mirror unit 36. And, with mirror unit 36 set in this optimum image-forming position, the distance between marks 112c and 112d is measured. Based on this distance, the copying magnification is calculated (step C20), and it is discriminated whether or not an error of the copying magnification is below a predetermined, specified value (step C21). And, lens unit 30 is moved step by step until the magnification error falls below the specified value (step C22). Every time lens unit 30 is moved one step, it is discriminated whether or not the unit 30 can be moved (step C23), and if the movement is at the limit, the operation is in error. While lens unit 30 can move, for every 1-step movement, the flow returns to step C19 where the optimum image-forming position is attained and the copying magnification is calculated (step C20). When the magnification error falls blow the specified value, the position LNSPOS of lens unit 30 and the position MRRPOS of mirror unit 36 at that time are saved as variation compensation data in non-volatile memory 142 (step C24).

In this state, process (5) for detecting an error in the read-out position is then executed. More specifically, the position of first carriage 40 which permits the reading of mark 112f at the center of marks 112c and 112e is found and an error in the read-out position of the carriage is detected (step C25). This detected error is saved as variation compensation data CRGPOS in memory 142 (step C26).

This completes a variation compensation for providing an image at a 100% magnification.

Finally, process (6) for compensating the variation in the focal lengths of lenses is executed. As described earlier, for optical magnification change, lens unit 30 and mirror unit 36 should be moved by predetermined distances. The amount of the movement is proportional to the focal length of lens unit 30. For the marks shown in FIG. 11E, for instance, the magnification is on the enlarge side of a predetermined magnification. To provide an image at, for example, a 70% magnification, lens unit 30 is set at the 140% position and the magnification by the signal processing is set to 50%. For a 71% magnification, lens unit 30 is set at the 71% position and the magnification by the signal processing is set to 100%. At this time, to reverse the size relation between the 70% image and the 71% image, the positions of lens unit 30 and mirror unit 36 need to be changed in accordance with the focal length of lens unit 30. According to this embodiment, the optimum image forming position for providing an image with the optical maximum magnification or 140% magnification is detected (step C27) in the same procedure as is involved in process (4), and from this position data, data of the necessary amounts of movement of lens unit 30 and mirror unit 36, LNSL and MRRL, are calculated and are saved as variation compensation data in memory 142 (step C28).

Through the above-described procedure, a variation in lens unit 30, and the like, can be compensated and adjusted to provide the optimum image. The aforementioned processes (1) to (6) correspond to the mentioned steps as follows. Process (1) for correcting the inclination of the second carriage corresponds to steps C1–C7. Process (2) for correcting the right and inclination of the photoelectric converter corresponds to steps C8–C12. Process (3) for correcting the right and left dimension of the photoelectric converter corresponds to steps C13–C18. Process (4) for detecting the optimum image-forming position corresponds to steps C19–C23. Process (5) for detecting an error in the readout position corresponds to steps C24–C26. Process (6) for compensating a variation in the lenses' focal lengths corresponds to steps C27 and C28.

The normal copying operation of the copying machine which has been subjected to compensation for variation will now be explained.

First, an original is set on original table 12, the copy start key on operation panel 118 is depressed. Then, main controller 116 returns first and second carriages 40 and 42 to the home positions, and latches dark data for shading compensation in shading compensator 150 with respect to all the pixels of photoelectric converter 38, with exposure lamp 20 being turned off. Main controller 116 then lightens exposure lamp 20 After the amount of light from lamp 20 is stabilized, main controller 116 moves first carriage 40 to the position where white reference area 1121 of first reference original 112 can be read and causes photoelectric converter 38 to convert the reflection light from the area 1121 into an electric signal whereby white data for the shading compensation is latched in shading compensator 150.

Further, main controller 116 rotates drum 74 until gripper 96 reaches the sheet gripping position and rotates automatic feed roller 90 and separation roller pair 92 to feed out sheets from feeding cassette 88. Of the sheets set in cassette 88, the uppermost sheet is separated and fed to the sheet gripping position by separation roller 92 and the fore end of the sheet is gripped by gripper 96. When the fore end of the sheet is gripped, main controller 116 rotates drum 74 in the direction of the arrow b in FIG. 1. The controller 116 temporarily stops the rotation of drum 74 when gripper 96 exceeds the position of thermal head 76, and rotates pressing cam 80 to press thermal head 76 against drum 74. Main controller 116 then rotates carriage motor 126 to move first carriage 40 and second carriage 42 to thereby start the scanning of the original.

In other words, the light from exposure lamp 20 is irradiated on the original, and the reflection light is guided to photoelectric converter 38 sequentially through first mirror 24 on first carriage 40, second and third mirrors 26 and 28 of second carriage 42, lens unit 30 and fourth and fifth mirrors 32 and 3 of mirror unit 36. As a result, the image of the original is formed on the light receiving face of photoelectric converter 38. Photoelectric converter 38 performs photoelectric conversion to provide an electric signal and sends its output signal to A/D converter 148 of image processing section 146. A/D converter 148 converts the received signal into a digital signal which is in turn sent to shading compensator 150. Shading compensator 150 performs compensation for light quantity variation and sensitivity variation on the digital signal from A/D converter 148, based on the previously latched dark data and white data, and sends the resultant signal to resolution converter 152. This converter 152 performs compensation on the received signal so that the signal has a resolution corresponding to a selected magnification, and sends it to image quality improving section 154. After improving the image by performing the averaging or the like on the signal from resolution converter 152 and sends its output signal to gamma compensator 156. Gamma compensator 156 performs gamma compensation on the received signal and sends it to gradation converter 158. Gradation converter 158 performs gradation conversion on the received signal using, for example, dither method to provide a binary signal for forming an image and sends the binary signal to thermal head driver 160. Based on the binary signal, thermal head driver 160 controls the ON and OFF of each dot of thermal head 76 to reproduce the image of the original with fidelity.

In short, the image of the original formed on photoelectric converter 38 is converted into an electric signal, which is processed in image processing section 146, and thermal head 76 is driven on the basis of the processed signal. At that time, main controller 116 rotates drum 76 again in the direction of the arrow b at the timing at which the position of the image to be formed on a sheet coincides with that of the original. As drum 74 rotates, ink ribbon 82 is heated by thermal head 76 so that ink melted by the heat is transferred onto the sheet, thereby forming an image thereon. When the scanning of the original is completed, main controller 116 extinguishes exposure lamp 20. Subsequently, first and second carriages 40 and 42 are returned to the initial positions and pressure on thermal head 76 by pressing cam 80 is released. After rotating drum 74 until the rear end of the sheet reaches guide 102, main controller 116 rotates drum 74 in the direction of the arrow b' (counterclockwise direction). Consequently, the rear end of the sheet is separated from the surface of drum 74 by the separator (not shown), and the sheet is discharged through guide 102 to receiving tray 106 by exit roller pair 104. At this time, main controller 116 releases the gripping force of gripper 96 on the sheet at the proper timing, and then stops rotating drum 74 when gripper 96 is returned to the sheet gripping position. This completes the copying operation.

The above embodiment has been explained with reference to the case where this invention is applied to a digital copying machine which converts the image of an original into an electric signal through photoelectric conversion, performs a predetermined processing on the electric signal and forms an image corresponding to the original image on a sheet in accordance with the processed signal. This invention is not, however, limited to this particular type, but may be applied as well to a digital copying machine which forms an electrostatic latent image corresponding to the original image on a photosensitive member by controlling the modulation of a laser beam in accordance with the mentioned electric signal, develops the electrostatic latent image and transfers this image on the sheet. Further, the method for outputting the image of the scanned original is not limited to the type which forms the image on a sheet, but may be modified to display the image on the screen of a CRT display device.

Although the reference original is provided at either end of the original table according to the above embodiment, this invention is not limited to this type. For instance, as per the copying operation, a reference original with individual marks provided thereon may be disposed on the original table.

As explained above, variation in the optical system can be automatically compensated by measuring an error of an image magnification due to the optical system after this system is assembled in a copying machine and providing the copying machine with a function to compensate the variation in the optical system based on the measuring result. In addition, with the reference originals provided at both ends of the original table as per the above embodiment, adjustment of the copying machine can be done without taking a copy. This eliminates the need to measure the focal length and adjust the machine based on the measured data, which should be done by the prior art, thus facilitating the machine assembling and improving the magnification accuracy as compared with the conventional machine.

What is claimed is:

1. A scanning apparatus comprising:
   means for supporting an original having an image;
   means for applying light to the original supported by said supporting means;
   means for converting the light from the original into an electric signal corresponding to the original image with a predetermined first magnification;
   means for directing the light from the original to said converting means, said directing means having a fixed focal length and being movably disposed at a first position between said supporting means and said converting means;
   means, located in a vicinity of said supporting means, for displaying a reference position where said directing means should be located;
   means for detecting an error between the electric signal, corresponding to the light converted by said converting means and supplied through said directing means from said display means, and a pre-obtained electric signal corresponding to said display means;
   means for setting a second magnification corresponding to the original image and supplied through said directing means from the original to said converting means; and
   means for correcting the second magnification set by said setting means in accordance with the error detected by said detecting means and for moving said directing means to a second position corresponding to the corrected second magnification.

2. An apparatus according to claim 1, further comprising magnification changing process means for receiving said electric signal converted by said converting means and performing a predetermined signal processing on said electric signal to change the magnification of said optical image.

3. An apparatus according to claim 2, wherein said magnification changing process means changes said magnification by thinning said electric signal from said converting means for reduction and by using said same electrical signal for a plurality of enlargements.

4. An apparatus according to claim 1, wherein said converting means comprises a CCD type line sensor.

5. An apparatus according to claim 1, wherein said directing means comprises a lens unit slidable in a predetermined direction and a mirror unit having a plurality of mirrors and slidable in the same direction as said lens unit.

6. An apparatus according to claim 1, further comprising means for issuing a command for correcting at least an error in the focal length of said directing means.

7. A scanning apparatus comprising:
   means for supporting an original having an image;
   means for applying light to the original supported by said supporting means;
   means for converting the light from the original into an electric signal corresponding to the original image with a predetermined first magnification;
   means for directing the light from the original to said converting means, said directing means having a fixed focal length and being movably disposed at a first position between said supporting means and said converting means;
   means, located in a vicinity of said supporting means, for displaying a reference position where said directing means should be located;
   means for issuing a command for correcting at least the focal length of said directing means;
   means, responsive to the command supplied from said command issuing means, for detecting an error between the electric signal, corresponding to the light converted by said converting means and supplied through said directing means from said display means, and a pre-obtained electric signal corresponding to said display means;
   means for setting a second magnification corresponding to the original image and supplied through said directing means from the original to said converting means; and
   means for correcting the second magnification set by said setting means in accordance with the error detected by said detecting means and for moving said directing means to a second position corresponding to the corrected second magnification.

* * * * *